United States Patent
Kita et al.

(10) Patent No.: US 8,322,074 B2
(45) Date of Patent: Dec. 4, 2012

(54) POWER UNIT FOR POWER SLIDE APPARATUS

(75) Inventors: Shinichiro Kita, Nirasaki (JP); Naoki Hanaki, Nirasaki (JP); Ryoji Shimura, Nirasaki (JP)

(73) Assignee: Mitsui Kinzoku Act Corporation, Yokohama-Shi, Kanagawa (JP)

( * ) Notice: Subject to any disclaimer, the term of this patent is extended or adjusted under 35 U.S.C. 154(b) by 810 days.

(21) Appl. No.: 12/065,399

(22) PCT Filed: Aug. 29, 2006

(86) PCT No.: PCT/JP2006/317020
§ 371 (c)(1),
(2), (4) Date: Mar. 13, 2009

(87) PCT Pub. No.: WO2007/026724
PCT Pub. Date: Mar. 8, 2007

(65) Prior Publication Data
US 2009/0173011 A1    Jul. 9, 2009

(30) Foreign Application Priority Data

Aug. 29, 2005   (JP) ................................. 2005-247587
Aug. 29, 2005   (JP) ................................. 2005-247588

(51) Int. Cl.
*E05F 11/54*   (2006.01)
(52) U.S. Cl. ...................... 49/360; 296/155; 192/84.961
(58) Field of Classification Search .................... 49/360; 296/155; 192/84.961
See application file for complete search history.

(56) References Cited

U.S. PATENT DOCUMENTS

| | | | | |
|---|---|---|---|---|
| 5,076,016 | A * | 12/1991 | Adams et al. ................... | 49/360 |
| 5,138,795 | A * | 8/1992 | Compeau et al. ............... | 49/138 |
| 5,896,703 | A * | 4/1999 | Wright et al. ................... | 49/339 |
| 5,913,563 | A * | 6/1999 | Watanabe et al. .............. | 296/155 |
| 6,199,322 | B1 * | 3/2001 | Itami et al. ...................... | 49/139 |
| 6,231,113 | B1 * | 5/2001 | Armbruster et al. .......... | 296/155 |
| 6,270,149 | B1 * | 8/2001 | Fukumoto et al. ............. | 296/155 |
| 6,408,573 | B1 * | 6/2002 | Fukumoto et al. ............. | 49/360 |
| 6,964,449 | B2 * | 11/2005 | Takeda et al. ............... | 296/146.4 |
| 7,100,326 | B2 * | 9/2006 | Shimada et al. ................ | 49/360 |
| 7,644,540 | B2 * | 1/2010 | Ichinose ......................... | 49/360 |
| 2004/0003542 | A1 * | 1/2004 | Shimada et al. ................ | 49/360 |
| 2004/0065017 | A1 * | 4/2004 | Priest et al. ..................... | 49/352 |
| 2004/0104594 | A1 * | 6/2004 | Shimura et al. ............ | 296/146.8 |
| 2005/0055883 | A1 * | 3/2005 | Sato et al. ....................... | 49/360 |
| 2005/0161973 | A1 * | 7/2005 | Yokomori ..................... | 296/155 |
| 2005/0183924 | A1 * | 8/2005 | Fukumoto et al. ........ | 192/84.961 |

FOREIGN PATENT DOCUMENTS

JP    2004-036193 A    2/2000

(Continued)

*Primary Examiner* — Katherine W Mitchell
*Assistant Examiner* — Marcus Menezes
(74) *Attorney, Agent, or Firm* — Browdy and Neimark, PLLC

(57) ABSTRACT

A power unit 16 includes an armature 38 rotated always in unison with a cable drum 17 and movable in an axial direction of a drum shaft 25, a flange 39 always connected to a motor 28 side, and a magnetic coil portion 37 bringing the armature 38 into abutment against the flange 39. The armature is disposed adjacent to a side of the drum rim body 23 of the cable drum 17, the magnetic coil portion 37 is disposed on the other side of the armature 38, and the flange 39 is disposed between the magnetic coil portion 37 and the armature 38.

9 Claims, 2 Drawing Sheets

FOREIGN PATENT DOCUMENTS

| | | |
|---|---|---|
| JP | 2000-145282 A | 5/2000 |
| JP | 2002-227880 A | 8/2002 |
| JP | 2003-41853 A | 2/2003 |
| JP | 2004-262345 A | 9/2004 |
| JP | 2005-083170 A | 3/2005 |
| JP | 3627744 B2 | 3/2005 |
| JP | 2006-125037 A | 5/2006 |
| WO | 2004-106687 A1 | 12/2004 |

* cited by examiner

POWER UNIT FOR POWER SLIDE APPARATUS

TECHNICAL FIELD

The present invention relates to a power slide apparatus for a vehicle slide door, and more particularly, to an improvement of a power unit for the power slide apparatus.

BACKGROUND ART

Conventionally, there is a known power unit for a power slide apparatus (see patent documents 1 and 2). The power unit includes a cylindrical cable drum which rotates around a drum shaft by power of a motor and has a door-opening cable and a door-closing cable wound around an outer periphery of the cable drum. The power unit also includes a clutch mechanism which switches between a connection state in which rotation of the motor is transmitted to the cable drum and a non-connection state in which the rotation is not transmitted to the cable drum. In the power unit, when the cable drum rotates in the door-opening direction, the door-opening cable is reeled up around the cable drum, and the door-closing cable is pulled out from the cable drum to slide the slide door in the door-opening direction. When the cable drum rotates in the door-closing direction, the door-closing cable is reeled up around the cable drum, and the door-opening cable is pulled out from the cable drum to slide the slide door in the door-closing direction.

The patent document 1 discloses a structure in which a mechanical clutch mechanism is disposed in an inside space of a cable drum of the power slide apparatus, and the patent document 2 discloses a power slide apparatus using an electromagnetic clutch mechanism.

Patent document 1: JP Laid-open No. 2000-145282 A
Patent document 2: JP Laid-open No. 2005-083170 A
Patent document 3: JP Laid-open No. 2004-036193 A

DISCLOSURE OF THE INVENTION

Generally, a conventional power unit using an electromagnetic clutch mechanism includes an armature which is attracted by a magnetic force of a magnetic coil portion, and a flange against which the attracted armature abuts with a friction resistance. However, since the armature and the flange are disposed at a position far away from the cable drum, the design of the power unit is not rational, and the power unit is large in size in the axial direction of the drum shaft.

If the length of the drum shaft of the power unit is increased, higher strength is naturally required for the drum shaft. Thus, it is necessary that the drum shaft be formed of heavy and expensive metal. This fact causes another problem that the cable drum which can be made of resin must be formed as a member that is independent of the drum shaft, the number of parts is increased, the assembling cost is increased, and the assembling precision is deteriorated.

Further, since the conventional power unit has sufficient output for smoothly sliding the slide door, the power unit is heavy, and a metal base plate which supports the heavy power unit is also heavy in structure. In addition, the heavy power unit is prone to vibrate when a vehicle runs, and this vibration may bring about unexpected metal fatigue in the base plate. Thus, the conventional base plate is reinforced in many ways, and there is a tendency that the base plate further becomes heavy.

Hence, it is an object of the present invention to provide a power slide apparatus in which an armature and a flange of the power unit are disposed rationally, thereby reducing a power unit in size.

It is another object of the invention to reduce the vibration itself of the power unit to prevent the base plate from increasing in weight. Thus, in the invention, a difference in weight between power units disposed on both sides of the base plate is reduced, thereby reducing the vibration itself of the power unit.

BEST MODE FOR CARRYING OUT THE INVENTION

Figure 1:
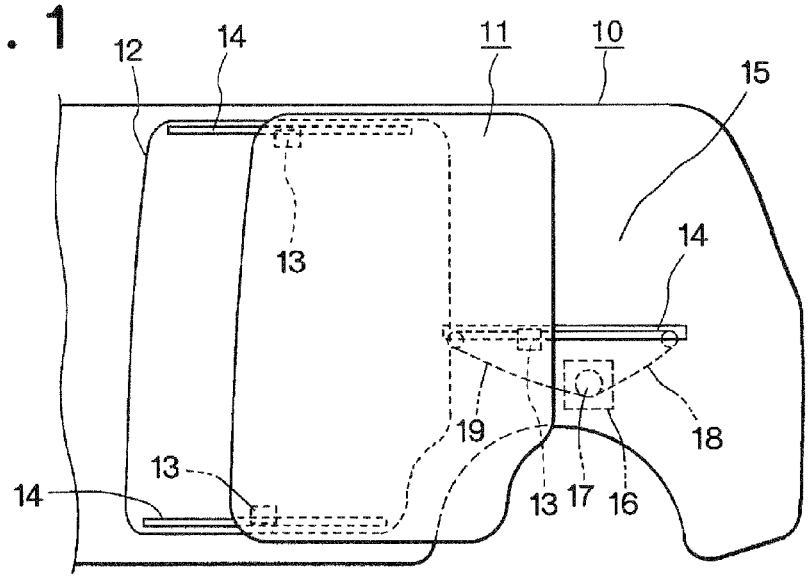
FIG. 1 is a side view showing a relation among a vehicle body, a slide door and a power unit.

An embodiment of the present invention will be explained with reference to the drawings. FIG. 1 shows a vehicle body 10, a slide door 11 which is slidably mounted on the vehicle body 10, and a door opening 12 which can be closed with the slide door 11. The slide door 11 is provided with a plurality of guide rollers 13. The vehicle body 10 is provided with a plurality of guide rails 14 which are slidably engaged with the guide rollers 13. The slide door 11 is slidably mounted on the vehicle body 10 by the engagement between the guide rollers 13 and the guide rails 14.

Figure 2:
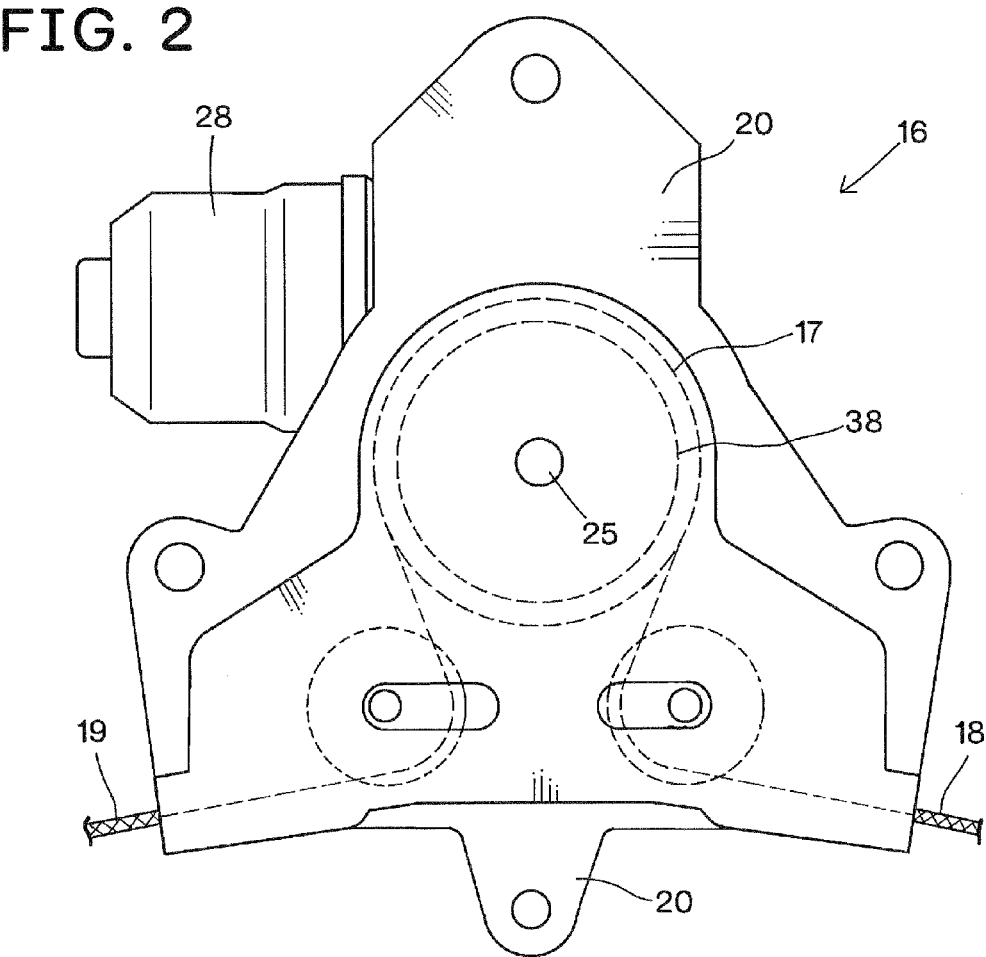
FIG. 2 is a side view of the power unit.
Figure 3:
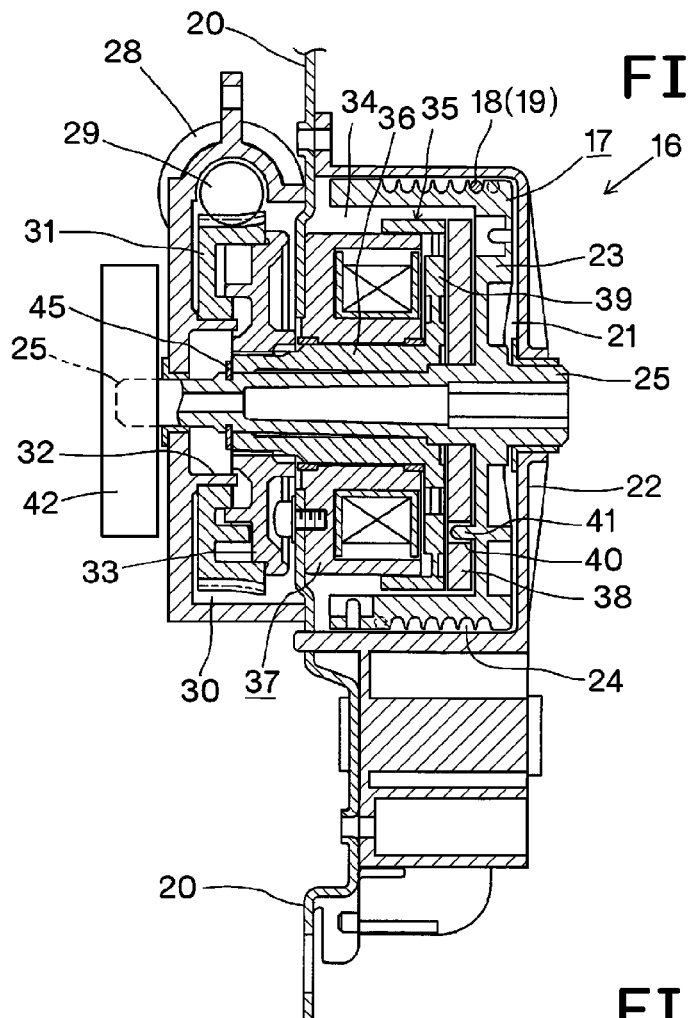
FIG. 3 is a sectional view of the power unit.
Figure 4:
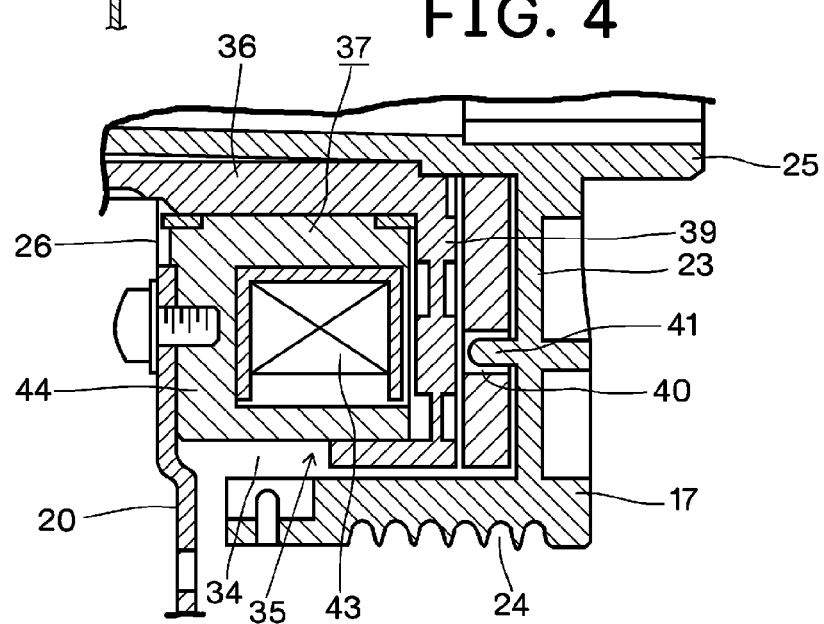
FIG. 4 is an enlarged sectional view of the power unit.

A power unit 16 of the power slide apparatus is provided in a vehicle inside space of a quarter panel 15 of the vehicle body 10. As shown in FIGS. 2 and 3, the power unit 16 is provided with a cable drum 17, and base ends of a door-opening cable 18 and a door-closing cable 19 are connected to the cable drum 17. Tip ends of the cables 18 and 19 are connected to the slide door 11. When the cable drum 17 rotates in a door-opening direction, the door-opening cable 18 is reeled up, the door-closing cable 19 is pulled out, and the slide door 11 moves in the door-opening direction. When the cable drum 17 rotates in the door-closing direction, the door-opening cable 18 is pulled out, the door-closing cable 19 is reeled up and the slide door 11 moves in the door-closing direction.

The position where the power unit 16 is disposed is not limited to the space in the vehicle of the quarter panel 15, and the power unit 16 may be disposed in an inside space in the slide door 11 as described in the patent document 3 in detail. In this case, the tip ends of the cables 18 and 19 are connected to the vehicle body 10.

As shown in FIG. 3, the power unit 16 includes a vertical plate-like metal base plate 20 fixed to the vehicle body 10 (or slide door 11) by a bolt. A resin drum-side case 22 which defines a first accommodation chamber 21 is fixed to one side of the base plate 20, and the cable drum 17 is accommodated in the first accommodation chamber 21.

The cable drum 17 is of a cylindrical shape provided at its one side surface with a drum rim body 23. The other side of the cable drum 17 is opened to outside. Cable grooves 24 are formed in an outer peripheral surface of the cable drum 17, and the cables 18 and 19 are wound around the cable grooves 24. The cable drum 17 is made of resin, a drum shaft 25 is integrally formed on the center of the cable drum 17, one end of the drum shaft 25 projects outward from the drum rim body 23 and the drum-side case 22 is rotatably supported on the one end of the drum shaft 25. The other end of the drum shaft 25 projects toward the other side through a communication hole 26 of the base plate 20, and the other end of the drum shaft 25 is rotatably supported by a gear-side case 27 which is fixed to the other side of the base plate 20.

A forward reverse motor 28 of the power unit 16 is disposed on the other side of the base plate 20, a cylindrical worm 29 is mounted on an output shaft of the motor 28, and a worm wheel 31 disposed in a second accommodation chamber 30 defined by the gear-side case 27 meshes with the cylindrical worm 29. The worm wheel 31 is rotatably supported by a boss portion 32 formed on an inner side surface of the gear-side case 27 such that an axis of the worm wheel 31 matches with an axis of the drum shaft 25. An annular transmitting body 33 which rotates in unison with the worm wheel 31 is disposed near one side of the worm wheel 31.

An essential portion of an electromagnetic clutch mechanism 35 of the power unit 16 is disposed in an internal space 34 surrounded by an outer peripheral surface of the cable drum 17. When the clutch mechanism 35 is switched to the connection state, rotation of the worm wheel 31 (annular transmitting body 33) is transmitted to the cable drum 17, but when the clutch mechanism 35 is returned to the non-connection state, the connection between the cable drum 17 and the worm wheel 31 (motor 28) is released, and the cable drum 17 can freely rotate with respect to the worm wheel 31.

The electromagnetic clutch mechanism 35 includes a relatively long sleeve 36 which is disposed on an outer periphery of a central portion of the drum shaft 25, an annular magnetic coil portion 37 disposed on an outer periphery of the sleeve 36, and an annular armature 38 disposed near an inner surface of the drum rim body 23.

The sleeve 36 is retained to the drum shaft 25 by a fastening 45 such as an E-ring and the sleeve 36 does not move in the axial direction of the drum shaft 25, but the sleeve 36 can rotate with respect to the drum shaft 25. The other end of the sleeve 36 is engaged with a key groove with respect to the annular transmitting body 33. With this, the sleeve 36 is always connected to the motor 28 through the annular transmitting body 33 and the worm wheel 31.

The magnetic coil portion 37 is disposed on the outer periphery of the sleeve 36, and a field 44 on the outer periphery of a coil 43 thereof is fixed to one of side surfaces of the base plate 20 by a screw or the like. The communication hole 26 of the base plate 20 has such a size that the sleeve 36 can pass therethrough. The metal bas plate 20 is disposed on as wide a space as possible of the other side surface of the magnetic coil portion 37. With this, the metal base plate 20 functions as a magnetic shield with respect to a magnetic force generated by the magnetic coil portion 37, and it is possible to largely reduce the magnetic field of the magnetic coil portion 37 exerted on the other side from the base plate 20.

An annular flange 39 is integrally formed on one end of the sleeve 36, and the annular flange 39 is disposed between the armature 38 and the magnetic coil portion 37 in the axial direction of the drum shaft 25. One side surface of the annular flange 39 is formed as an abutment surface having a high friction coefficient. When the armature 38 is attracted by the other side by the magnetic force of the magnetic coil portion 37, the armature 38 abuts against the annular flange 39 with high friction coefficient and the rotation of the annular flange 39 is transmitted to the armature 38.

The armature 38 is formed with a plurality of engagement holes 40 extending in the axial direction of the drum shaft 25, and a plurality of drum pins 41 projecting from the drum rim body 23 toward the other side are slidably engaged with the engagement holes 40. The engagement between the drum pins 41 and the engagement holes 40 is not released even when the armature 38 moves in the axial direction of the drum shaft 25 by the magnetic force of the magnetic coil portion 37. Therefore, the armature 38 is connected such that the armature 38 rotates always in unison with the cable drum 17, and when the armature 38 comes into close contact with the flange 39 with the magnetic force of the magnetic coil portion 37, the clutch mechanism 35 is brought into the connection state, power of the motor 28 is transmitted to the cable drum 17, and when the magnetic coil portion 37 is brought into the OFF state, the friction contact between the armature 38 and the flange 39 is released, the clutch mechanism 35 is brought into the non-connection state, and the connection between the motor 28 and the cable drum 17 is released.

The other end of the drum shaft 25 projects outward toward the other side beyond the gear-side case 27, and a sensor unit 42 is mounted on the projected portion of the drum shaft 25. The sensor unit 42 measures a rotation speed, a rotation direction and a rotation amount of the drum shaft 25 (cable drum 17). The sensor unit 42 is preferably a magnetic sensor including a magnet and a Hall IC, but since the magnetic field of the magnetic coil portion 37 which exerts a harmful influence on the sensor unit 42 is largely shielded by the base plate 20, it is unnecessary to especially provide a distance between the sensor unit 42 and the magnetic coil portion 37 and thus, the projecting amount of the drum shaft 25 to the other side can be reduced.

In the present invention, the armature 38 which rotates in unison with the cable drum 17 is disposed adjacent to the other side surface of the drum rim body 23. Therefore, the side space of the drum rim body 23 can be utilized effectively, and the armature 38 and the cable drum 17 can be connected with each other using a simple structure such as the engagement hole 40 and the drum pins 41. Since the armature 38 can be connected to the cable drum 17 not through the drum shaft 25, no machining or working processing is required for connecting the armature 38 to the drum shaft 25, the strength of the drum shaft 25 is not deteriorated because no machining or working processing is required and thus, the drum shaft 25 and the cable drum 17 can integrally be formed of resin.

In the invention, the armature 38, the flange 39 and the magnetic coil portion 37 are disposed side-by-side in this order from the drum rim body 23 toward the other side. Thus, the electromagnetic clutch mechanism 35 can be formed compact, and can be substantially accommodated in the internal space 34 of the cylindrical cable drum 17.

The sleeve 36 which connects the annular flange 39 on the side of the motor 28 extends from the worm wheel 31 (annular transmitting body 33) toward the one side (toward the drum). Thus, the mechanism which transmits the power of the motor 28 to the cable drum 17 can be provided only on the one side from the worm wheel 31 (annular transmitting body 33), and the drum shaft 25 can be formed more compact in the axial direction.

In the invention, the power of the motor 28 is transmitted to the cable drum 17 not through the drum shaft 25. Thus, a load to the drum shaft 25 is further reduced, the strength required for the drum shaft 25 is further reduced, and the drum shaft 25 and the cylindrical cable drum 17 can be formed integrally easily.

In the invention, the armature 38 is placed on the bottom of the cable drum 17 and then, the sleeve 36 is put on the outer periphery of the drum shaft 25 and the sleeve 36 is locked to the drum shaft 25 by the fastening 45. With this, the cable drum 17, the armature 38 and the sleeve 36 can easily be assembled, and these assembled parts can be utilized as one unit which is not easily separated from each other. Thus, the assembling procedure can further be enhanced.

In the invention, the magnetic coil portion 37 is disposed on the one side of the metal base plate 20 fixed to the vehicle body 10 or the slide door 11 by means of a bolt or the like, and the motor 28 is disposed on the other side of the metal base plate 20. With this, the unbalance of weight between the one side and the other side of the base plate 20 can be reduced, and metal fatigue of the metal base plate 20 caused by vibration when the vehicle runs can be reduced.

Since the heavy loads are disposed on the one side and the other side of the base plate 20 in the dispersion manner, a barycenter of the power unit 16 can be brought closer to the base plate 20 in the axial direction of the drum shaft 25. With this, a difference in thickness between the one side and the other side of the base plate 20 is reduced and thus, the power unit 16 can freely be disposed vertically reversely, laterally reversely or front-back reversely. Therefore, layout which suits the shape of the disposing space becomes excellent.

In the invention, the magnetic coil portion 37 is fixed directly to the metal base plate 20. With this, the base plate 20 can be used as a heat sink of the magnetic coil portion 37, and it is possible to reduce the performance deterioration caused by heat of the magnetic coil portion 37.

In the invention, the magnetic coil portion 37 is provided on one side of the metal base plate 20, and the sensor unit 42 which detects the rotation of the cable drum 17 is disposed on the other side of the base plate. With this, the base plate 20 functions as an interruption wall with respect to a magnetic field generated by the magnetic coil portion 37, and it is possible to reduce an influence of the magnetic field received by the sensor unit 42.

The invention claimed is:

1. A power unit for a power slide apparatus comprising:
a cylindrical cable drum rotated around a drum shaft by power of a motor, and has an outer periphery around which a door-opening cable and a door-closing cable are wound, the drum shaft having a proximal end near the motor and a distal end;
a metal base plate fixed to a vehicle body or a slide door on the vehicle body, the metal base plate is vertically oriented, the motor being disposed on a first side of the metal base plate;
a clutch mechanism switched between a connection state in which rotation of the motor is transmitted to the cable drum and a non-connection state in which the rotation of the motor is not transmitted to the cable drum;
wherein when the cable drum is rotated in a door-opening direction, the door-opening cable is reeled up around the cable drum and the door-closing cable is pulled out from the cable drum to slide a slide door in the door-opening direction, and when the cable drum is rotated in the door-closing direction, the door-closing cable is reeled up around the cable drum and the door-opening cable is pulled out from the cable drum to slide the slide door in the door-closing direction;
said clutch mechanism including an armature rotated always in unison with the cable drum and movable in an axial direction of the drum shaft; a flange always connected to the first side of the metal base plate; and a magnetic coil portion attracting the armature along the axial direction of the drum shaft when the magnetic coil portion is turned ON to bring the armature into abutment against the flange with a friction resistance, the magnetic coil portion of the clutch mechanism being disposed on a second side of the metal base plate;
said cable drum including a drum rim body provided near the distal end of the drum shaft;
said armature disposed axially inward and adjacent to the drum rim body on the drum shaft;
wherein rotation of the armature is transmitted to the drum rim body not through the drum shaft,
wherein the drum shaft is provided at its outer periphery with a sleeve which is rotatable relative to the drum shaft, the flange is provided on a first end of the sleeve on the side of the armature, a second end of the sleeve is always connected to the first side of the metal base plate, and a portion of the other end of the sleeve is disposed on the second side of the metal base plate,
wherein the cylindrical cable drum and the drum shaft are integrally formed of resin.

2. The power unit for the power slide apparatus according to claim 1, wherein the magnetic coil portion is disposed on a side opposed to the drum rim body with respect to the armature, and the flange is disposed between the magnetic coil portion and the armature.

3. The power unit for the power slide apparatus according to claim 2, wherein half or more of the clutch mechanism is accommodated in an internal space of the cylindrical cable drum in the axial direction of the drum shaft.

4. The power unit for the power slide apparatus according to claim 1, wherein half or more of the clutch mechanism is accommodated in an internal space of the cylindrical cable drum in the axial direction of the drum shaft.

5. The power unit for the power slide apparatus according to claim 1, wherein the magnetic coil portion is fixed to the metal base plate.

6. The power unit for the power slide apparatus according to claim 5, wherein half or more of the magnetic coil portion is accommodated in an internal space surrounded by an outer periphery of the cable drum in the axial direction of the drum shaft of the cable drum.

7. The power unit for the power slide apparatus according to claim 1, further comprising a sensor unit which detects rotation of the cable drum disposed on the metal base plate on the motor side.

8. The power unit for the power slide apparatus according to claim 1, wherein half or more of the clutch mechanism is accommodated in an internal space of the cylindrical cable drum in the axial direction of the drum shaft.

9. The power unit for the power slide apparatus according to claim 1, further comprising a fastening for retaining the sleeve to the drum shaft.

* * * * *